United States Patent [19]

Takeda et al.

[11] 4,453,395

[45] Jun. 12, 1984

[54] SHELL OF A UNIVERSAL-JOINT AND A MANUFACTURING METHOD THEREFOR

[75] Inventors: Koichi Takeda, Okazaki; Sadao Ikeda; Koichi Matsubara, both of Toyota, all of Japan

[73] Assignee: Toyota Jidosha Kogyo Kabushiki Kaisha, Aichi, Japan

[21] Appl. No.: 342,010

[22] PCT Filed: Apr. 7, 1981

[86] PCT No.: PCT/JP81/00079
§ 371 Date: Jan. 15, 1982
§ 102(e) Date: Jan. 15, 1982

[87] PCT Pub. No.: WO81/03294
PCT Pub. Date: Nov. 26, 1981

[30] Foreign Application Priority Data

May 24, 1980 [JP] Japan .................................. 55-69499

[51] Int. Cl.³ .............................................. B21D 51/16
[52] U.S. Cl. ........................................ 72/370; 72/348
[58] Field of Search .................... 72/348, 370; 464/111

[56] References Cited

U.S. PATENT DOCUMENTS

| 1,248,482 | 12/1917 | Grob | 72/348 |
| 2,947,081 | 8/1960 | Clevenger | 72/370 |
| 3,792,596 | 2/1974 | Orain | 464/111 |
| 4,154,082 | 5/1979 | Beech | 72/370 |

Primary Examiner—Lowell A. Larson
Attorney, Agent, or Firm—Parkhurst & Oliff

[57] ABSTRACT

A shell for a universal joint for flexibly coupling two rotary shafts. The shell is constructed using a manufacturing technique to produce a shell of light weight and excellent strength. The shell generally has a hollow cylindrical configuration and is secured at one end to a rotary shaft and formed to have a plurality of grooves extending parallel to its cylindrical axis. A second rotary shaft includes portions which engage the plurality of grooves for transmitting movement from one shaft to the other through the shell. The shell may be formed using a tubular work piece or a planar work piece, and may be provided in substantially complete form by use of a machine press prior to subjecting the material to an ironing process to make the grooves of accurate shape and dimension. The process is performed such that no machining is required to form the grooves and produce the shell.

13 Claims, 17 Drawing Figures

SHELL OF A UNIVERSAL-JOINT AND A MANUFACTURING METHOD THEREFOR

DESCRIPTION

1. Technical Field

This invention relates to a shell of a universal-joint and a manufacturing method therefor, and more particularly to a technology of manufacturing the shell, which has conventionally relied upon forging and machining, by means of pressing and ironing processes.

2. Background Art

As a species of universal-joints for flexibly joining a pair of rotary shafts, one is known wherein rotary movement of one rotary shaft is transmitted to the other rotary shaft such that one end of a shell of the universal-joint is fixed to one rotary shaft, such as a differential side gear shaft in a vehicle, while the other end of the shell allows the receipt of the other rotary shaft for transmission of movement. The other shaft may, for example, include portions which engage axial grooves formed in the internal surface of the shell.

In some universal-joints of this type such as tripod joint, double offset plunging joint, Rzeppa joint, Weiss joint, etc., the shell has been conventionally manufactured by forming a hollow cylindrical material or thick-walled blank of thick wall through extrusion such as hot forging or cold forging, followed by a forging process applied to the formed thick walled, cylindrical blank with a punch and a die and a machining process for forming the grooves to a desired shape and dimension.

The above-mentioned manufacturing method is problematical in various respects, for example, being low in productivity because of its laborious and time-consuming process of machining at the final stage of manufacture. This also results in increased cost or decrease in strength of the products because of machining or cutting of the material after the forging.

Adoption of the forging process inevitably requires the products to be thick-walled in the above-mentioned method, which results in the products being heavy and expensive in material cost.

This invention was made from such a background. It is therefore a primary object of this invention to provide a light and strong shell as a component of a universal-joint for flexibly coupling a first rotary shaft and a second rotary shaft which is to transmit rotation of the first rotary shaft, wherein the shell of hollow cylindrical shape is formed such that one end thereof is fixed to the first rotary shaft, while the other end is open so as to allow the second rotary shaft to be inserted thereinto, and a plurality of grooves are made inside the shell along the axis thereof for allowing engagement with engaging members disposed on the end of the inserted second rotary shaft.

It is another object of this invention to provide a method of inexpensively manufacturing such a shell as mentioned above.

DISCLOSURE OF INVENTION

A shell of a universal-joint according to this invention is made by forming the shell with a press machine from a pipe or plate material piece, and requiring no machining for forming the grooves on the inside of the shell.

The manufacturing method for the universal-joint shell of this invention is composed of a preliminary forming process wherein a preliminary pressing process is executed to form the grooves in a hollow cylindrical material piece and a finishing process wherein a ironing process is applied to the preliminarily formed grooves for finishing them to a desired shape and dimension. The cylindrical material piece may either be a pipe of a predetermined length or one made by a drawing or stamping process from a plate member with a press machine.

In a preferred mode of the manufacturing method the above-mentioned preliminary forming process includes a process wherein the hollow cylindrical material piece is inwardly formed to have protrusions at a plurality of suitable places so as to form a plurality of grooves between every two of the neighboring protrusions. The protrusions are slanted with respect to the axis of the cylindrical piece such that the protrusion gradually slopes closer to the axial line from one end of the cylindrical material piece toward the other end thereof. Thereafter, the finishing process is applied to finish the grooves into an accurate or optimal shape and dimension by means of applying an ironing process simultaneously accompanied by a drawing process applied to the sloped protruded portions starting from one end where the same are nearest to the axis and continuing toward the other end thereof so as to make the sloped protruded portions parallel to the axis.

In another preferred mode of the manufacturing method the preliminary forming process is performed, by a first die to be inserted into the inside of the hollow cylindrical material piece and a second die placed outside of the cylindrical piece for being moved perpendicularly to the axis of the cylindrical piece, so as to form inwardly protruded portions at several suitable places of the piece under a pressing process. In this process the grooves are formed between every two of the neighboring protrusions. A finishing process is then applied for finishing the grooves, by means of applying an ironing process along the axial line of the cylindrical piece, to form it into an exactly optimal shape and dimension.

The method in accordance with this invention enables reduction of the weight of the finished article (unlike in the traditional forging process which is weak in the production of articles of thin wall) and, consequently, a reduction of material cost. It also enables elimination of machining for formation of the grooves, which results in enhancement of productivity a great deal, leading to economization of the production cost. Moreover, the finished articles are excellent in strength and highly reliable because the metal flow line in the material does not require cutting by the machining process in the groove forming.

A shell in accordance with this invention is particularly preferable for the use as a universal-joint for coupling the power transmitting shafts in a vehicle.

BEST MODE FOR CARRYING OUT THE INVENTION

An embodiment of this invention applied to a shell of a constant velocity universal-joint, for coupling a differential side gear shaft of a vehicle with a countershaft transmitting the rotational motion of the former, will be described hereunder in detail with reference to the appended drawings.

Figure 1:
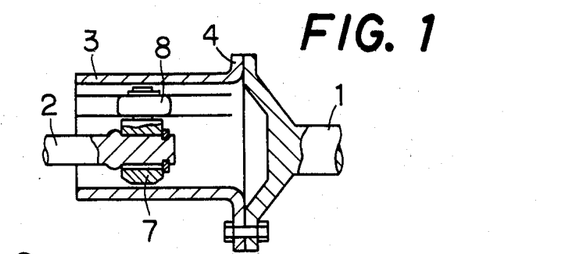
FIG. 1 is an elevational sectional view for showing how a universal-joint including a shell in an embodiment of this invention is connected with rotary shafts.
Figure 2:
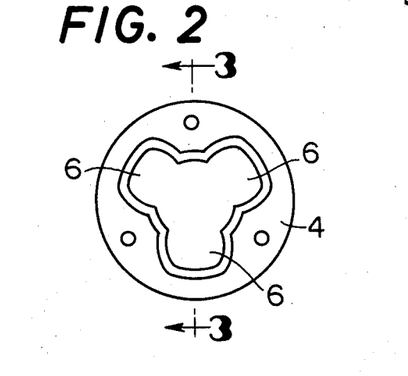
FIG. 2 is a profile of the shell in FIG. 1.
Figure 3:
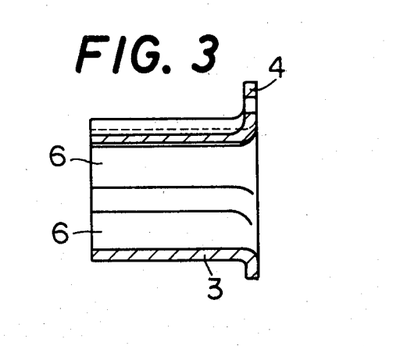
FIG. 3 is a sectional view taken along the section line 3—3 in FIG. 2.

In FIGS. 1-3, a universal-joint of tripod type secured to a differential side gear shaft 1 for transmitting its rotation to a countershaft 2 is illustrated. A shell 3 is a hollow cylindrical body open at opposite ends thereof, and having a flange 4 at one of the ends which is coupled with the shaft 1 by means of bolts. The shell 3 is provided on the internal surface thereof with three grooves 6 extending along the axis of the cylindrical body. A fixed member 7 secured on the end portion of the countershaft 2 is adapted to be engaged with the groove 6 by way of a roller 8.

Figure 4:
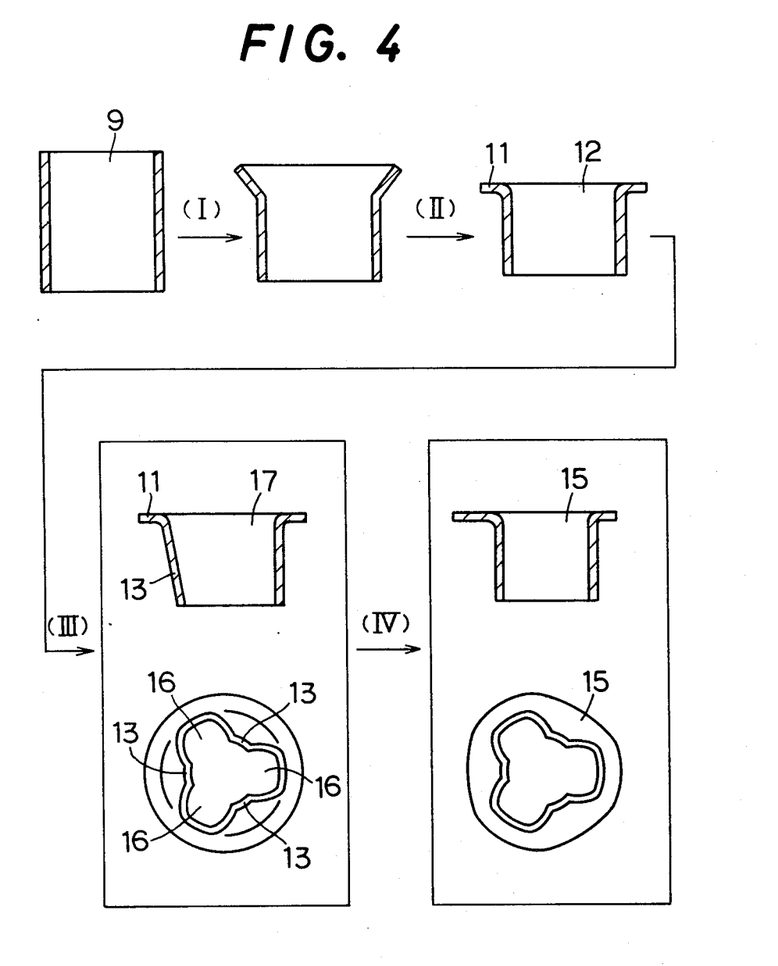
FIG. 4 is a chart for showing a manufacturing process as an embodiment of this invention.

A manufacturing method for a universal-joint having such a structure will be described with reference to the chart in FIG. 4. On a hollow cylindrical blank 9 having almost the same wall thickness and external diameter as a finished article, a flanging process is applied for forming a flange 11 thereon. This process includes a first flanging process (I) and a second flanging process (II), and the number of each process is suitably determined depending on the material of the cylindrical blank 9 and the external diameter of the flange to be formed. The flanging process is followed by such treatments as annealing, shot-blast, phosphate pickling, etc. (these treatments may be applied beforehand on the cylindrical blank or on a later described plate or sheet blank), and preliminary forming (III) of the grooves. This preliminary forming process (III) is for facilitating formation of the grooves in a final or finishing process (IV). In the process (III), the cylindrical portion of a flanged piece 12 is protruded at a suitable number of plural places thereof inwardly by means of a known method, for example, press drawing or stamping. Each protruded portion 13 is longitudinally formed to slope (slant) radially inward toward the axis of the cylinder 9 as viewed from the flanged end 11 toward the other end of the blank 9. Consequently, sloped (slanted) grooves 16 are formed between protruded portions 13 along the axis of the cylindrical blank 9. In the process (IV), an ironing and drawing process is applied to the preliminary formed piece 17 with the slanted grooves as a finishing process for providing a finished article 15 having the grooves 16 formed into an optimal shape and dimension. The ironing process will be described in detail according to the specific steps thereof, along with an apparatus therefor shown in FIG. 5.

Figure 5:
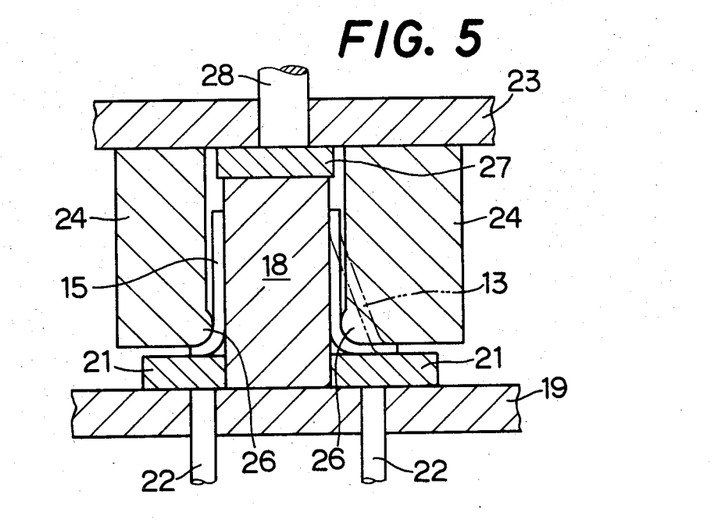
FIG. 5 is an elevational sectional view of an apparatus performing the fourth (IV) process shown in FIG. 4.

In FIG. 5, numeral 18 designates a punch secured to a lower base 19. The punch 18 is provided, at three places corresponding to the protruded portions 13 of the preliminarily formed piece 17, with recessed portions, and the external configuration is formed complementary to the internal configuration of the finished article 15. On the lower base 19 a knock-out plate 21 is disposed, which is connected to eject pins 22 secured to a lower die plate (not shown) and pushed upwards by the lower die plate while guided by the punch 18. On the lower side of an ascendable and descendable upper base 23 a die 24 is secured with bolts or the like. On the internal peripheral portion at the lower end of the die 24 an inwardly protruded portion 26 is formed. This portion 26 is spaced from the external surface of the punch 18 by a distance slightly smaller than the thickness of the preliminarily formed piece 17. On the lower side of the upper base 23 a knock-out plate 27 which is larger in cross-section than the punch 18 is disposed. This knock-out plate 27 is placed within the die 24 and spaced from the latter, and connected to an eject pin 28 so that it is pushed downwards due to descending of the eject pin 28.

Steps of the process for performing the ironing with such an apparatus will be described. The preliminarily formed piece 17 is fixed on the punch 18 in the manner shown in FIG. 5. The flanged end of the piece 17 is contacted with the knock-out plate 21 at this time. When the die 24 is moved downward with the upper base 23 thereafter, the slanted protruded portions 13 formed in the preliminarily formed piece 17 will be gradually compressed by ironing and drawing as the dye 24 moves downward and the area surrounding the grooves 16 shown in FIG. 4 will be ironed at the same time by the die 24 and the punch 18 and formed into a desired shape. In accordance with the above, a part of the drawing process and the finishing process (i.e., the ironing process) are carried out simultaneously. The upper base 23 begins to ascend when it has reached the lower dead point. If the finished article is stuck to the punch 18, it is removed from the punch 18 by means of pushing upwards of the knock-out plate 21 with the eject pins 22. When the finished article is stuck to the die, on the contrary, it is removed therefrom by means of pushing downwards on the other knock-out plate 27 with the eject pin 28. In accordance with the preceeding, the ironing process of the grooves is completed.

The above-mentioned embodiment is concerned with a method of forming a shell from a hollow cylindrical blank. The shell can also be made from a plate material as will be described hereinafter with respect to FIG. 6.

Figure 6:
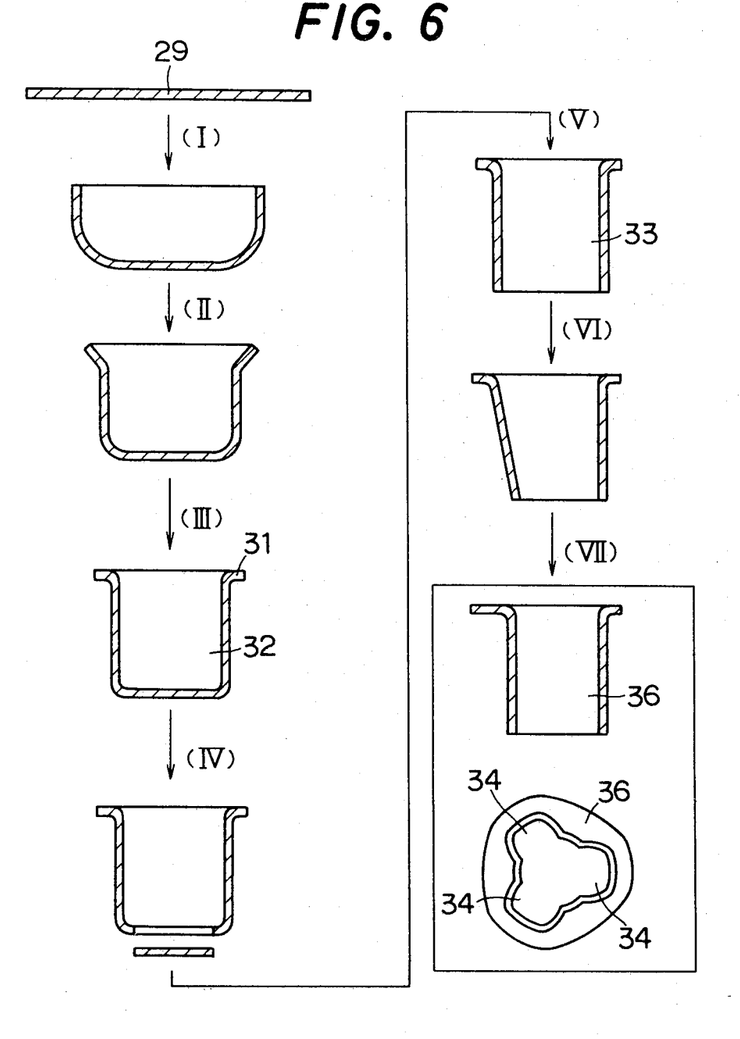
FIG. 6 is a chart for showing a manufacturing process as another embodiment of this invention.

Numeral 29 in FIG. 6 designates a flat plate blank for a shell, which can be formed, through a first drawing or stamping process (I), a flanging process (II), and a further drawing process (III), into a hollow cylindrical form with a bottom and with a flange 31. The number of drawing processes will be suitably determined by the material of the blank, and the diameter, length, etc., of the cylindrical portion, just like in the aforementioned flange forming process. This cylindrical piece 32 with a bottom is subjected to a subsequent press punching process (IV) to remove the button, and then to a process (V) of straightening the rounded portion in the neighborhood of the bottom for making the piece 32 truly cylindrical. This cylindrically formed piece 33 can be, just in the similar way as described for the previous embodiment, i.e., the preliminary forming process (VI) and the ironing process (VII), made into a shell 36 having grooves 34 of desired shape and dimension.

Figure 7:
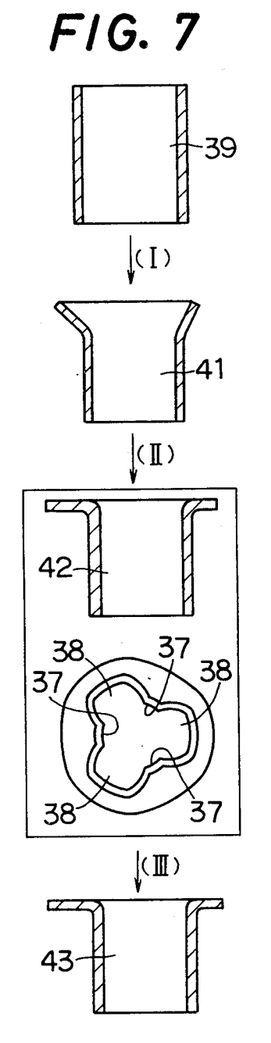
FIGS. 7-9 are respectively a chart for showing a manufacturing process as a respectively different embodiment of this invention.

Some other embodiments of this invention will be described with reference to FIGS. 7-9, in which three different methods of manufacturing the shell are illustrated. A shell 43 shown in FIG. 7 is of almost similar shape as the shell 36 in the previous embodiment. The manufacturing method for the shell 43, wherein the protruded portions 37 and the grooves 38 are parallel to the axis, will be explained first in accordance with FIG. 7. In a first process (I) preliminary formation of grooves is applied to a hollow cylindrical blank 39 so as to make inward protrusions at three places, with a result of forming grooves of desired configuration between adjacent protruded portions. In this first process (I) a first flanging process is included, although it is possible to separate this first flanging process from the preliminary groove forming process. The latter can be performed as described in detail later by insertion of a first die into the cylindrical blank 39, followed by urging of a second die against the blank 39 in a direction perpendicular to the axis thereof. A preliminarily formed piece 41 thus obtained is subject to a flange formation in a second process (II) to form a flanged piece 42. Grooves 38 in the flanged piece 42 will be finished to have a desired shape and dimension in a subsequent groove ironing process, a third process (III). The manufacture of the shell 43 is completed in accordance with the preceeding steps.

Figure 8:
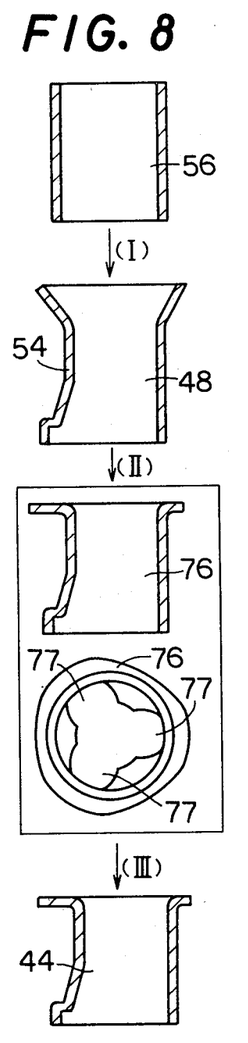
Figure 9:
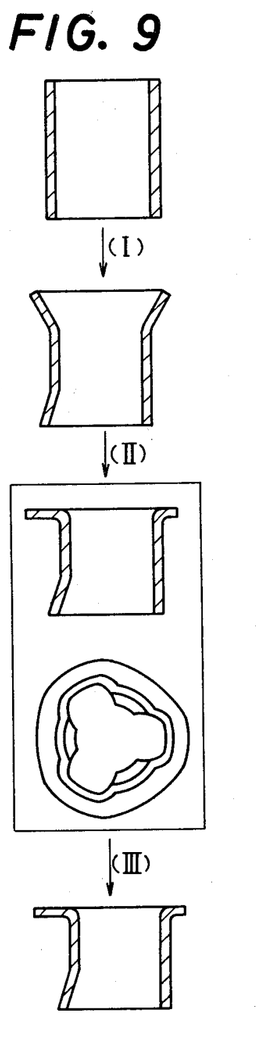

Shells shown in FIG. 8 and FIG. 9 are respectively so shaped as to be adaptable to the shape of the engaging portion of the countershaft 2 which is to be inserted into the shell for connection with the differential side gear shaft 1. The manufacturing method thereof uses the same process as that described in connection with the embodiment illustrated in FIG. 7.

Figure 10:
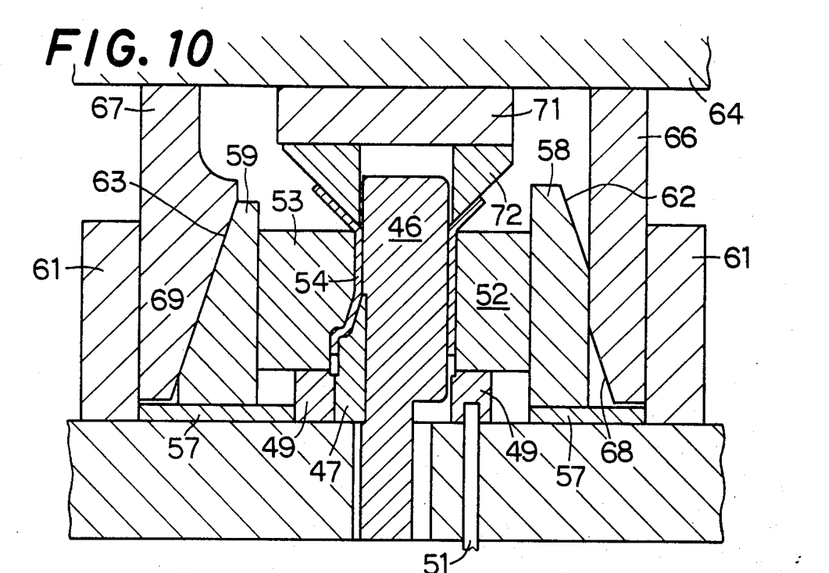
FIG. 10 and FIG. 11 are respectively an elevational sectional view and a sectional view in plan of an apparatus performing the preliminary forming process (I) illustrated in FIGS. 7-9.
Figure 11:
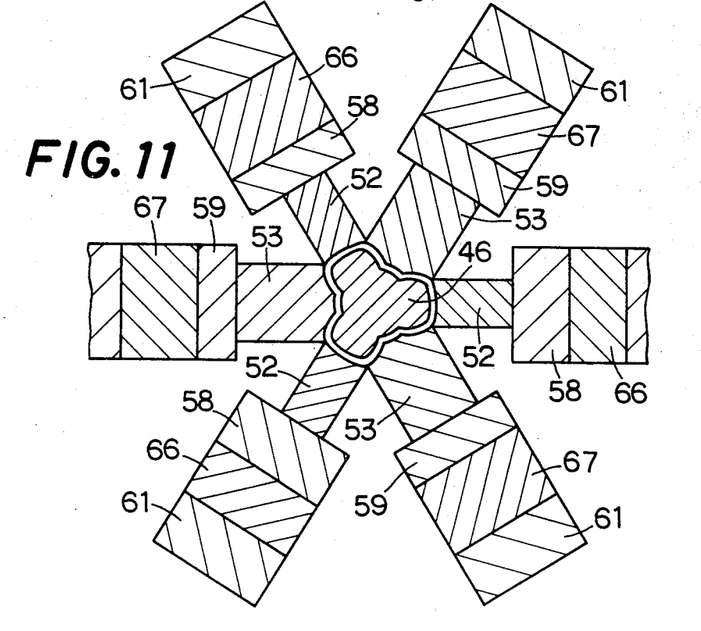
Figure 12:
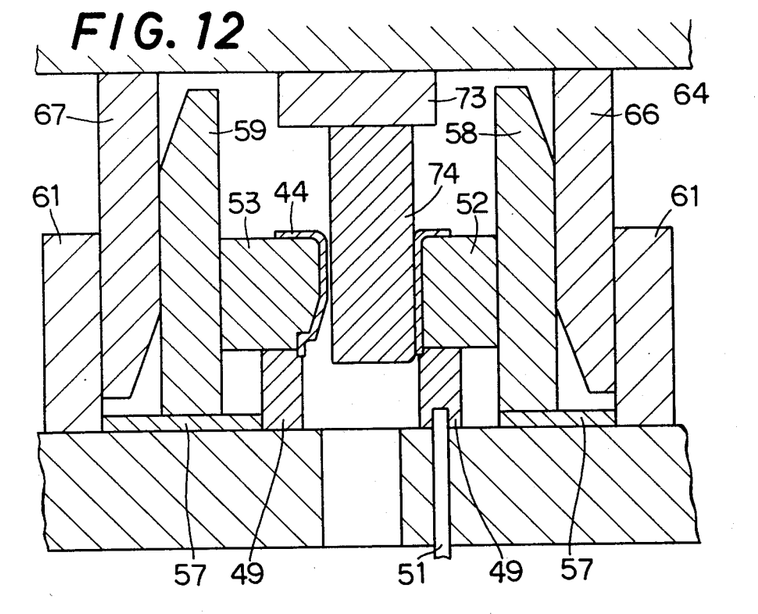
FIG. 12 is an elevational sectional view of an apparatus performing the finishing process (III) illustrated in FIGS. 7-9.

Further detailed description will be presented with reference to FIGS. 10-12, regarding the most important process of preliminary groove formation (I) and that of groove ironing (III). The description will be made with reference to the manufacture of a shell 44 shown in FIG. 8 formed by use of the apparatus shown in FIGS. 10 and 11.

With reference to FIGS. 10 and 11 an apparatus for the preliminary groove forming process will be described first, wherein numeral 46 designates a principal punch secured on a base plate (not shown). Three recesses arranged with an angular spacing of 120° from each other are formed on the external periphery of the principal punch 46, so that the peripheral configuration of the punch in cross-section is such as to form the same internal cross-sectional configuration of the preliminarily formed piece 48 shown in FIG. 8. In each of the recessed portions of the principal punch 46 a sub-punch 47 is respectively fixed with a bolt. The principal punch 46 and the sub-punches 47 may of course be integrally made. Shape of the sub-punch 47 is adapted for the formation of protrusions with desired configuration on the preliminarily formed piece 48. Around the principal punch 46 and the sub-punches 47 at the foot thereof, a spacer 49 is disposed for placing the blank thereon. This spacer 49 is connected to eject pins 51 so that it is pushed upwards in response to the ascending of the eject pins 51. On the spacer 49 three sets of dies 52, 53 opposed to each other respectively are so arranged as to surround the principal die 46 around the axis thereof. The dies 53, three in number, are radially arranged respectively with an equal angular distance from each other at the angular positions where the sub-punches 47 are secured, that is where the protruded portions 54 are formed on the preliminarily formed piece 48. The dies 52, three in number, are also radially arranged with an equal angular distance. The shape of the internal end surface of the dies 52, 53 is respectively adapted to be suitable for forming the blank 56 shown in FIG. 8 into a desired form, that is, fitted to the external outline configuration of the preliminarily formed piece 48. Those dies 52, 53 are secured respectively on a movable cam 58, 59 which is disposed outside the dies on a sliding base 57, under the guidance of a guide rod (not shown) erected on a fixed block 61. They are laterally (in FIG. 10) movable according to the movement of the movable cams 58, 59 which are biased radially outwardly, that is in a direction away from the principal punch 46, by means of a resilient member (not shown) made of urethane rubber or a spring, etc., which is attached at one end thereof to the fixed block 61.

The movable cams 58, 59 are respectively provided with slanted surfaces 62, 63 which are engaged by corresponding slanted surfaces 68 and 69 of cams 66 and 67 so that cams 58 and 59 are moved inwardly towards the die 46 in response to the downward movement of cams 66 and 67.

On the lower side of the upper base 64 a flange block 72 is secured by way of an attaching block 71.

The preliminary forming process employing the above-mentioned apparatus will be described. The blank 56 is fitted on the principal punch 46 and the sub-punches 47. Descending of the fixed cams 66, 67 along with the upper base 64 at this stage will cause the movable cams 58, 59 to be inwardly urged against the resilient force of the resilient members. This will in turn move the dies 52, 53 secured on the movable cams 58, 59 inwardly against the wall of the blank 56 received on the punches 46 and 47. Grooves of almost desired configuration will be formed in this manner on the side wall of the blank 56.

Downward movement of the upper base 64 causes the flange block 72 to also move downward to engage and expand an upper end of the blank 56 to form a flange portion flared at a predetermined angle. While in the apparatus shown in FIG. 10, formation of the flange is performed simultaneously with the preliminary formation of the shell, the flange formation may be performed independently by using different members to move the flange block 72 and cams 66 and 67.

Ensuing lift of the fixed cams 66, 67 together with the upper base 64 will cause the ascending of the flange block 72 and the outward retracting of the movable cams 58, 59, owing to the action of the resilient members connected thereto. Subsequent pushing upwards of the spacer 49, due to the action of a cushion mechanism (not shown) and by the eject pins 51, causes the preliminarily formed piece 48 to be raised upwards for completing the preliminary forming process with removal of the piece 48 from the punches 46, 47.

The preliminarily formed piece 48 thus obtained will be subsequently subject to the flange formation process (II) and the groove ironing (III) process. The latter process will be described next in relation to an apparatus therefor with reference to FIG. 12.

A punch 74 is secured to an upper base 64 via an attaching block 73 which is of almost identical configuration to the principal punch 46 shown in FIGS. 10 and 11. The only difference in the punch 74 is that it is adapted to provide an additional amount of protrusion corresponding to the amount of reduction to be performed during the ironing process on the protruded portions formed respectively between two of the three recesses shown in FIG. 11. A detailed explanation of the additional features of the structure of FIG. 12 is unnecessary since it is identical to the structure described in FIG. 10 with respect to the preliminary formation of the article. Accordingly, downward movement of base 64 (after flanged piece 76 of FIG. 8 has been placed on spacer 49) will cause inward movement of dies 52 and 53, due to the action of cams 66 and 67 and cams 58 and 59, and will set the flanged piece 76 at a predetermined position. The punch 74 may be partially inserted into the flanged piece 76 in advance of cam movement so long as it does not forcibly contact the flanged piece 76. Thereafter, further movement of the upper base 64 and the punch 74 will cause grooves 77 of the flanged piece 76 to be exposed to an ironing action as the punch 74 descends downwardly between the dies 52 and 53. After the upper base 64 has reached its lowermost position, the upper base 64 may be raised to allow the dies 52 and 53 to be retracted outwardly and release the finished article 44. The aforementioned steps complete the groove ironing process.

Figure 13:
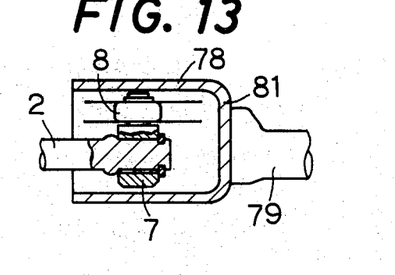
FIG. 13 and FIG. 14 are respectively an elevational sectional view of a universal-joint including a shell of respectively different shape.
Figure 14:
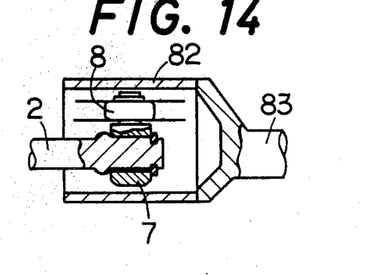

Another embodiment of a shell of the universal-joint of different shape, as shown in FIGS. 13 and 14, will be detailed below. In one instance, the shell 78 of FIG. 13 is of a cylindrical configuration which includes a bottom 81 and is connected to a differential side gear shaft 79 at the bottom 81 by welding or the like. Alternatively, the shell 82 shown in FIG. 14 is of cylindrical configuration and open at both ends with a differential side gear shaft 83 coupled at one end thereof by welding or the like.

Figure 15:
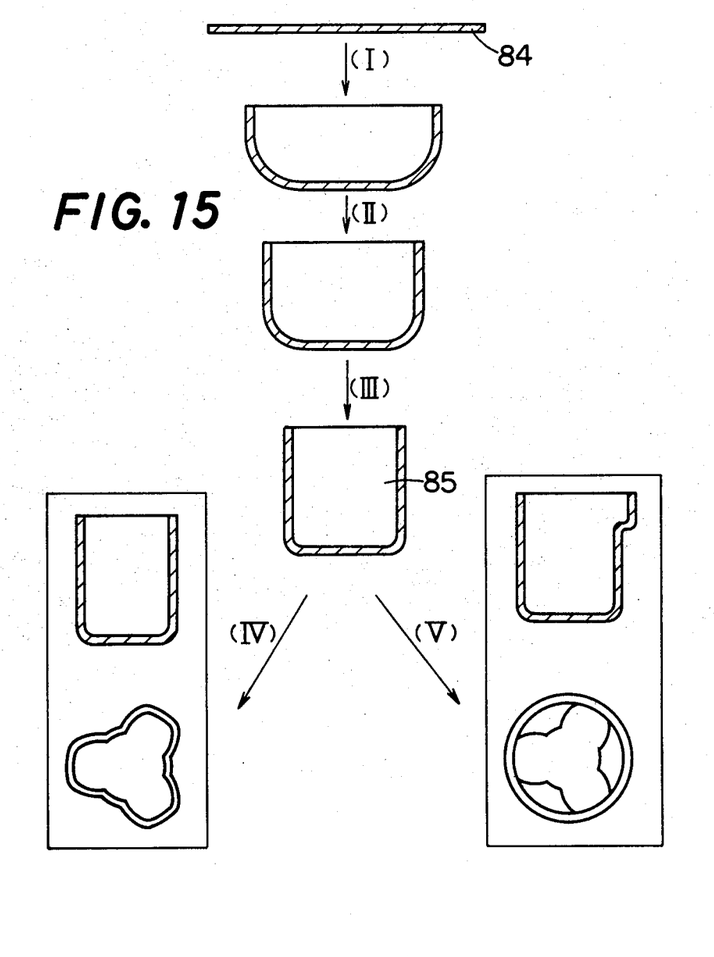
FIG. 15 and FIG. 16 are respectively a chart for showing a manufacturing process of the shell respectively illustrated in FIG. 13 and FIG. 14.

A manufacturing method for the shell 78 shown in FIG. 13 will be described first. This method consists of a three-stepped drawing or stamping process, a first (I), a second (II), and a third (III) step for forming a bottomed cylindrical piece 85 from a plate material piece 84 as shown in FIG. 15, and a groove forming process (IV) or (V). The groove forming process is composed of a preliminary forming step and a finishing step just like in the description mentioned related to the previous embodiment. The details of those processes are identical to those operations illustrated therein.

Figure 16:
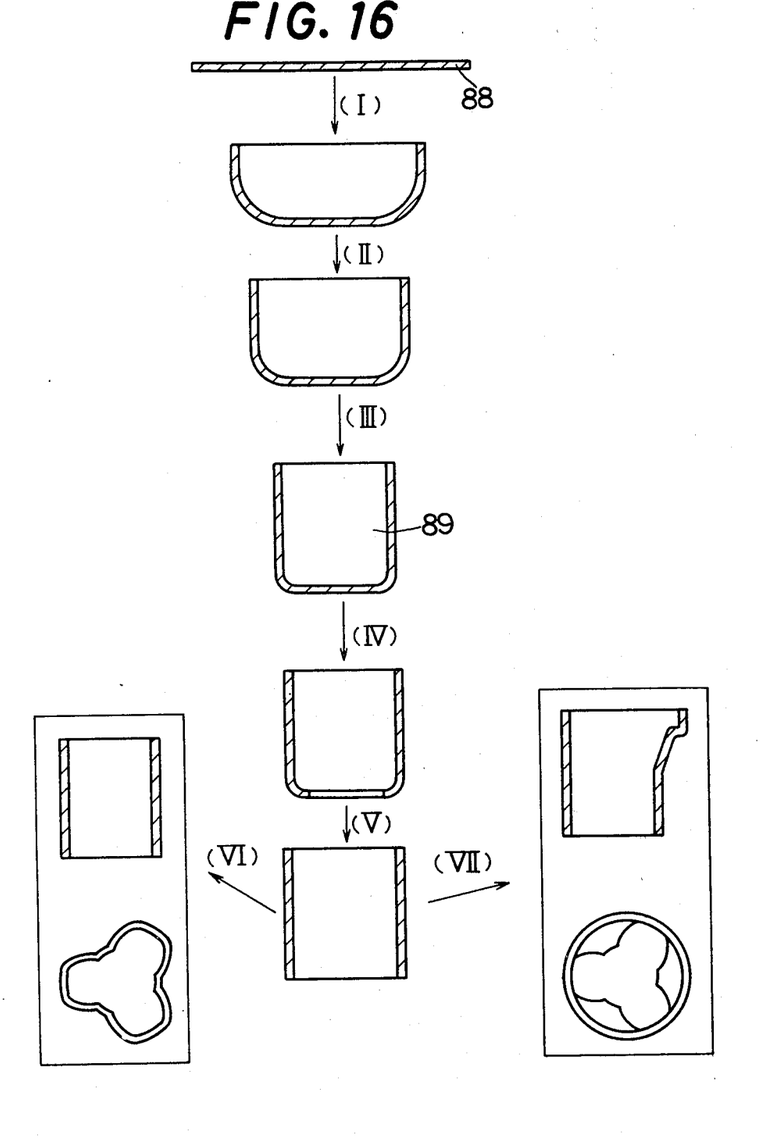
Figure 17:
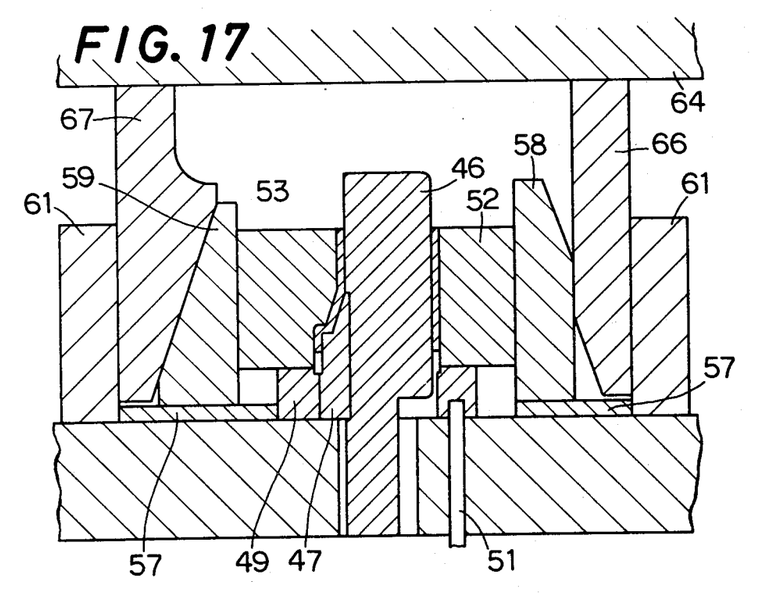
FIG. 17 is an elevational sectional view of an apparatus performing the finishing process illustrated in FIG. 15 and FIG. 16.

Manufacturing process for a shell shown in FIG. 14 is illustrated in FIG. 16. This method consists of a three-stepped drawing process (similar to that shown in FIG. 15) for forming a bottomed cylindrical piece 89 from a plate material piece 88, i.e., a first step (I), a second step (II), and a third process (III), a press punching step (IV), a hole expanding process (V), and a groove forming step (VI) or (VII). The groove forming step includes a preliminary groove forming process and a finishing step. The preliminary groove forming process is performed by an apparatus shown in FIG. 17, which is similar to that shown in FIG. 10, with the only difference being the absence of the flanging block 72 and the attaching block 71 for preliminary flange formation. A further detailed description is considered unnecessary since an illustration of the apparatus is considered sufficient for an understanding thereof.

We claim:

1. A method of manufacturing a flanged shell of hollow cylindrical shape for a universal joint comprising:
   selecting a tubular blank having internal and external surfaces and an axis extending between first and second ends thereof;
   working said tubular blank to form an intermediate article configuration having a plurality of protrusions extending axially of the blank and spaced circumferentially about the blank, said article being formed to have a flange at said first end extending radially outward from the axis of said blank and said protrusions being formed to slope inwardly toward said axis along the length of said blank from said first end to said second end, said protrusions defining a corresponding plurality of grooves on the internal surface of said tubular blank;
   subjecting said intermediate article to an ironing process applied to the external surface of the article to compress the sloped protrusions to form a plurality of protrusions which extend generally parallel to said axis and define an equal number of said grooves parallel to said axis.

2. The method of claim 1 wherein said step of subjecting includes compressing said intermediate article starting at said second end and proceeding to said first end.

3. The method of claim 1 wherein said step of working said tubular blank includes working said tubular blank with a machine press to form said intermediate article configuration.

4. The method of claim 1 wherein said step of working said tubular blank comprises working said tubular blank to form said flange such that the flange extends perpendicular to the axis of the blank prior to the formation of said plurality of protrusions.

5. The method of claim 1 wherein said step of subjecting includes placing said intermediate article over a die and moving a punch parallel to said axis and into contact with said article from said second end to said first end to inwardly compress said protrusions.

6. The method of claim 1 wherein said selecting step comprises selecting a blank of plate mterial and forming said tubular blank by performing a drawing process on said plate material with a machine press.

7. A method of manufacturing a shell of hollow cylindrical shape for a universal joint comprising:
   selecting a tubular blank having internal and external surfaces and an axis extending between first and second ends;
   working said tubular blank to provide an intermediate article configuration having a flange extending from said first end and a plurality of protrusions extending axially of said article, said flange being formed to extend at an angle which is flared with respect to said axis and said protrusions being spaced circumferentially about the article and extending parallel to said axis, said protrusions defining corresponding grooves on the internal surface of said article; and
   subjecting said article to an ironing process to compress said article to conform to its final desired configuration.

8. The method of claim 7 wherein said working step includes placing said tubular blank between a first die and a plurality of second dies disposed radially of said first die, said second dies being spaced circumferentially about said first die and moveable perpendicular to the axis of the blank, simultaneously moving the second dies toward axis to form the protrusions parallel to said axis, and moving a third die axially with respect to said one end of said blank to form said flared flange.

9. The method of claim 8 wherein said step of forming said flared flange comprises forming said flange such that it extends radially outward and perpendicular to said axis.

10. The method of claim 8 wherein said subjecting step includes placing said intermediate article adjacent said second dies and moving a punch internally of said article along said axis to engage said article and compress the article between said punch and said second dies.

11. The method of claim 8 wherein said step of moving said third die comprises moving said third die simultaneously with said second dies.

12. The method of claim 8 wherein said step of forming said flared flange to be perpendicular to said axis is performed prior to said subjecting step.

13. The method of claim 8 wherein said step of selecting a tubular blank includes selecting a work piece of plate material and forming said tubular blank by performing a drawing process on said plate material with a machine press.

* * * * *